United States Patent [19]

Reinecke et al.

[11] Patent Number: 4,524,850
[45] Date of Patent: Jun. 25, 1985

[54] WEAR COMPENSATING OPERATING MECHANISM FOR DISK BRAKES

[75] Inventors: Erich Reinecke, Burgdorf; Fritz Isernhagen, Wunstorf, both of Fed. Rep. of Germany

[73] Assignee: WABCO Fahrzeugbremsen GmbH, Hanover, Fed. Rep. of Germany

[21] Appl. No.: 406,429

[22] Filed: Aug. 9, 1982

[51] Int. Cl.³ .................. F16D 65/14; F16D 65/54; F16D 55/10; F16D 65/24
[52] U.S. Cl. .................. 188/71.8; 188/196 P
[58] Field of Search .......... 188/71.8, 71.9, 196 P, 188/71.4, 71.3, 79.5 GE, 79.5 GT; 192/111 A

[56] References Cited

U.S. PATENT DOCUMENTS

| | | | |
|---|---|---|---|
| 3,186,521 | 6/1965 | Chouings | 188/71.8 |
| 3,221,854 | 12/1965 | Jaeschke et al. | 188/196 P |
| 3,952,841 | 4/1976 | Pringle | 188/71.8 |
| 4,026,391 | 5/1977 | Reinecke | 188/71.9 |
| 4,054,189 | 10/1977 | Klaue | 188/71.4 |
| 4,381,047 | 4/1983 | Gregoire et al. | 188/71.8 |

FOREIGN PATENT DOCUMENTS

| | | | |
|---|---|---|---|
| 2610651 | 9/1977 | Fed. Rep. of Germany | 188/78.1 |
| 2065250 | 6/1981 | United Kingdom | 188/71.8 |

*Primary Examiner*—Bruce H. Stoner, Jr.
*Assistant Examiner*—Alvin Oberley
*Attorney, Agent, or Firm*—J. B. Sotak

[57] ABSTRACT

A fluid pressure operated mechanism for a vehicular disk brake which includes two expansion elements capable of moving in opposite directions to each other. A compensating unit located between the two expansion elements to maintain a given stroke of the expansion elements and eliminate excess play which may be developed as a result of brake lining wear. The compensating unit takes the form of a one piece connecting link having return spring portions engaging one of the expansion elements and frictional gripping portions connected to the other of the expansion elements.

12 Claims, 10 Drawing Figures

DIRECTION OF EXPANSION

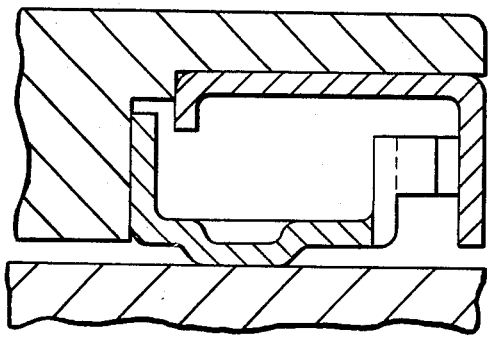
F1G.6A
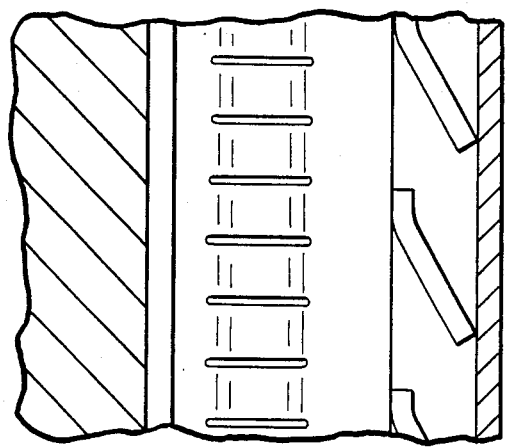
F1G.6B

WEAR COMPENSATING OPERATING MECHANISM FOR DISK BRAKES

FIELD OF THE INVENTION

This invention relates to an operating mechanism having brake shoe wear compensating means for disk brakes and more particularly to a one piece wear compensating unit which frictionally and resiliently cooperates with a pair of fluid pressure operated expansion elements for effecting a brake application on a brake disk by a pair of brake shoes and which automatically compensates for brake shoe wear to maintain a fixed braking stroke and clearance gap.

BACKGROUND OF THE INVENTION

Normally, the brake actuating device for a disk brake is comprised of two expansion elements which are operated in opposition to one another. Thus, the two brake shoe linings are forced against a brake disk by means of the expanding motion of the two elements. In order to compensate for any play of the expansion elements due to the wear of the brake linings, it has been found to be advantageous to provide a compensating device between the expansion elements. The compensator functions in such a way that when any given stroke exceeds a predetermined value, the difference in the relative motion between the expansion elements as a result of lining wear is corrected automatically.

A wear compensator of the type mentioned above is shown and disclosed in German Pat. No. DE 27 09 762 and in the corresponding British Pat. No. 1,597,405.

This previous compensator for taking up wear on the brake shoe linings includes a pair of expansion elements which are interconnected to a connecting link. Along with the connecting link, an additional spring member is supported against one of the two expansion elements and is operatively connected with the other of the two expansion elements by a separate friction element. The support member in conjunction with the spring member set up a force in opposition to the relative motion of the expansion elements when the brake lining is forced against a brake disk. For this type of compensator construction, a third component is required in addition to the friction element and the spring element to secure the spring element.

In this previous known compensator, the spring element consists of a helical spring. Thus, the size of the spring must be relatively large since relatively great forces are necessary to return the expansion elements to their brake release position from an expanded or braking position. In order to increase this return force, one variation disclosed in the above noted German Pat. No. DE 27 09 762 features the use of an additional helical spring.

In the past, the return stroke of the expansion elements at a standard brake was, as a rule, executed by specially designed sealing rings for hydraulic disk brakes. Previously, the seals served a triple function, namely, the sealing function of the pressure chamber, the standard return function plus the added wear adjustment function. However, these three functions frequently overstress the sealing rings so that certain problems would occur, such as, insufficient return and therefore residual drag of the brakes resulted in too great a return (no adjustment) and therefore too great a stroke of operation, and as a result of the special design (return function) excessive leakage losses.

In the present invention, there is essentially only one function required for the sealing rings, namely, their actual sealing function, since the functions of returning and adjusting will be executed by the compensator. Further, in a unique design of the expansion elements in an intermeshing construction, the dimensions of the operating devices become smaller, which produces a further advantage in view of the fact that space is limited as is within the disk brakes.

OBJECTS OF THE INVENTION

Accordingly, it is an object of this invention to provide a compensator of the type mentioned initially, namely, one which consists of relatively few structural parts and which does not require any large or additional springs to produce sufficient restoring forces.

Another object of this invention is to provide a unique compensating unit employing an integral structure which automatically adjusts for brake shoe wear.

A further object of this invention is to provide a one piece wear compensator for disk brakes having a fixed braking stroke.

These objects and the following advantages are obtained with the unique design of the present compensating unit which preferably is constructed of one single part:

(1) is cost-efficient and easy to produce due to one single part of hemogeneous material;

(2) is made of sheet material;

(3) is readily provided with projections and tapered areas;

(4) is formed of flat strip material with any number of projections;

(5) is usable with disk brakes having full brake shoe linings as well as with disk brakes having partial brake shoe linings; and (6) is compatible with mechanically, pneumatically, and hydraulically operated disk brakes;

(7) is designed with projections such as spring elements to effectively function as a plate spring to obtain greater spring tension.

Still another object of this invention is to provide a fluid pressure operated mechanism for disk brakes comprising a pair of expansion elements movable with respect to one another when the brake shoes are forced against the surfaces of the brake disks, compensating means located between the two expansion elements maintain given clearance between the surfaces of the brake disks and the brake shoes, the compensating means takes the form of a ring-shaped connecting link which is flexibly supported against one of the two expansion elements so as to oppose the relative movement of the expansion element during application of the brake shoes, the connecting link is frictionally connected to the other of the two expansion elements, a stop is provided on one of the two expansion elements to allow the connecting link to move relative to the other of the two expansion elements when the given clearance is exceeded, the connecting link includes a plurality of first projections which function as return spring elements, the connecting link includes a plurality of second projections for frictionally engaging the other of the two expansion elements.

BRIEF DESCRIPTION OF THE DRAWINGS

The above objects and other attendant features and advantages will become more readily appreciated as the subject invention becomes better understood by reference to the following detailed description when considered in conjunction with the accompanying drawings, wherein:

FIGS. 6A and 6B are partial schematic views of a compensating unit similar to that of FIGS. 1, 2A, and 2B, in which the flexible spring portion is angularly disposed.

DETAILED DESCRIPTION OF THE INVENTION

Figure 1:
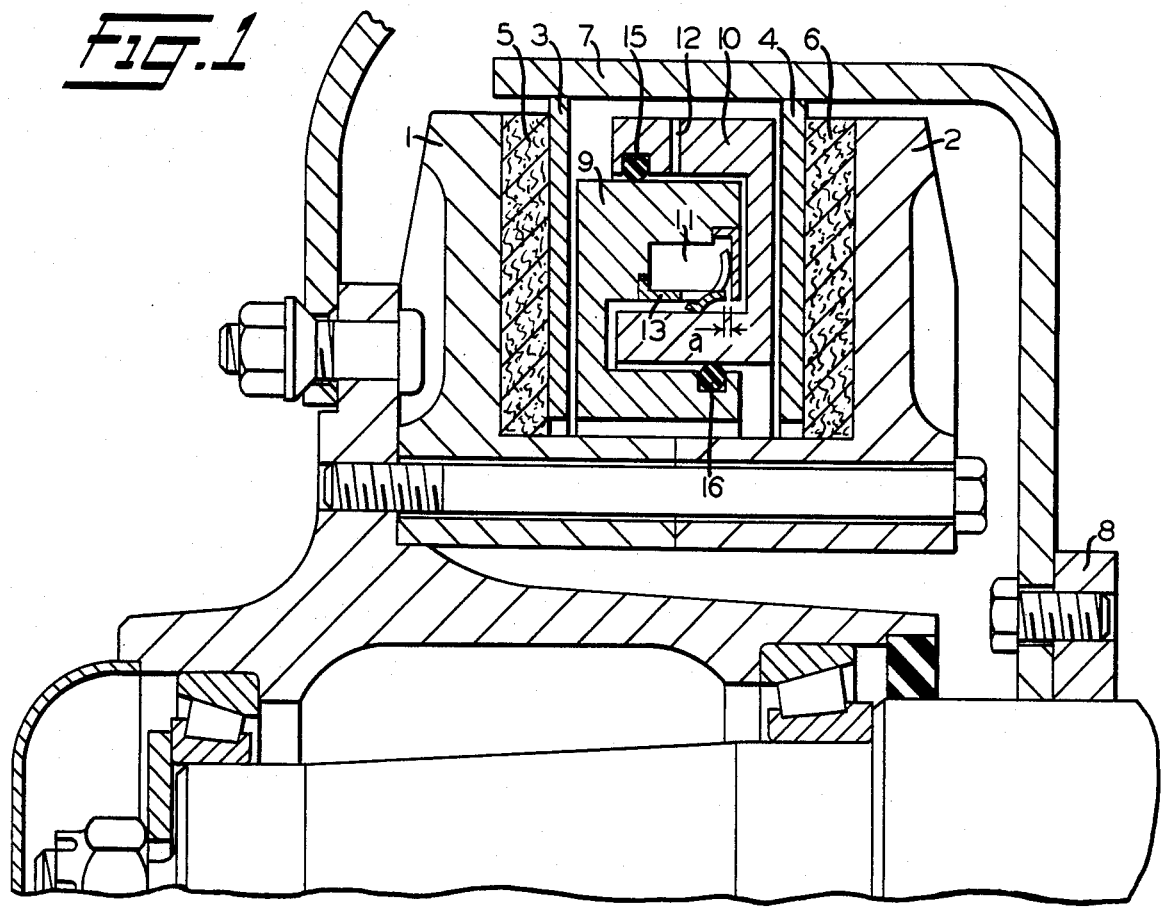
FIG. 1 is a sectional view taken through a vehicle wheel hub and axle, in which there is a full lining disk brake assemblage having an operating mechanism formed by a pair of interfitted expansion elements which include a compensating unit consisting of a distinct member.

Referring now to the drawings and in particular to FIG. 1, there is shown a disk brake assembly which includes a pair of rotatable brake disks 1, 2 which are bolted to the wheel hub of a vehicle axle (not characterized). The fixed or stationary parts of the brake assembly consist of a pair of brake bands 3, 4 and a pair of brake linings 5, 6 which make frictional contact with the flat machined surfaces of the rotating brake disks 1, 2. The brake bands 3, 4 are suspended from a brake bracket 7 so as to be axially movable between the machined faces of the brake disks 5, 6. The brake bracket 7 is attached to the axle flange 8 by a plurality of suitable bolts (not characterized).

Figure 2A:
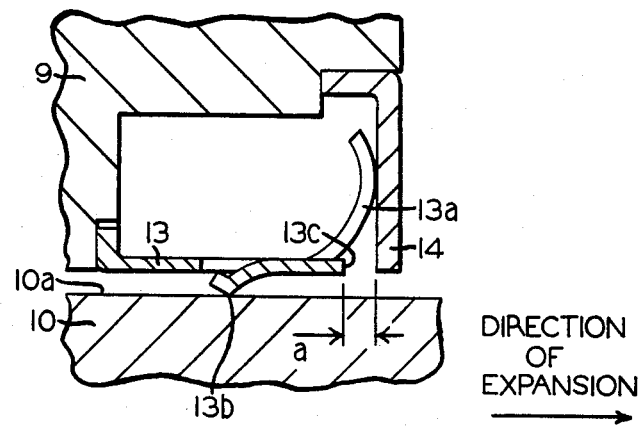
FIGS. 2A and 2B are partial sectional views of the compensating unit of FIG. 1.
Figure 2B:
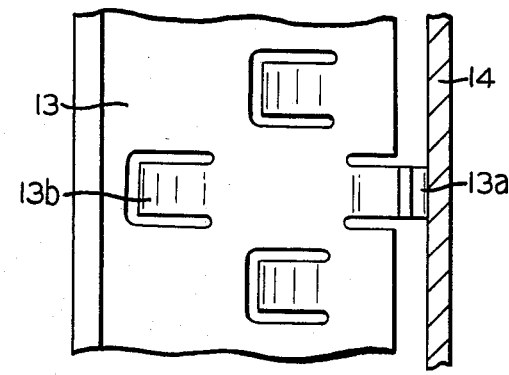

The operating mechanism for actuating the brake bands and linings is made up of two cross-sectional U-shaped expansion elements 9, 10. The legs of the U-shaped elements 9, 10 are interposed and are capable of moving in opposition to each other. The expansion stroke or brake application movement can be initiated through a pressure chamber 11 located within the expansion elements 9, 10. The chamber 11 can be supplied with fluid pressure via a port connection 12. A wear compensating unit 13 is disposed between the expansion elements 9, 10 in the pressure chamber 11. The compensator 13 consists of a sleeve-shaped connecting member which is concentrically arranged relative to the expansion elements 9, 10. The sleeve member 13 is provided with a plurality of two different forms of stamped projections 13a and 13b as shown in FIGS. 2A and 2B. The first projections 13a are designed as springs which are biased against an inner surface of an annular ring 14 carried by the expansion element 9. The recessed projections 13b are deflected by the ring 14 of the expansion element 9, during a relative motion of the expansion elements 9, 10 when the brake linings 5, 6 make contact with the machined surfaces of disks 1, 2. The second projections 13b are designed as friction contact members which engage the inner wall area 10a of the other expansion element 10. The friction forces applied to the expansion element 10 by the friction elements 13b are greater than the spring tensions of the elastic projections 13a. In the example as illustrated by FIGS. 1, 2A, and 2B, and edge 13c of the compensating unit 13 functions as a stop which engages the inner wall of ring member 14 and the spring portion is deflected during relative movement of elements 9, 10. A pair of pressure sealing rings 15 and 16 are disposed between members 9 and 10 to provide an air tight enclosure for the pressure chamber 11. Each of the spring tabs 13a of the compensating unit 13 are tapered towards their free ends so as to obtain a greater deformation distance.

The spring tabs 13a, 13b are equidistantly distributed throughout the periphery of the compensating ring so that the overall effect of the individual springs 13a represents that of a spring plate which has a compressive force greater than that of a return spring, which is an essential feature for hydraulically operated disk brakes.

It is advantageous if the projections 13b of the compensating unit 13 are designed as frictional contact elements. Preferably, they are constructed so as to be in elastic tension. As shown, the free ends of the resilient projections 13b are pointed into the direction of motion that the expansion element 10 assumes when the brake is released. Thus, due to the elastic construction and orientation of the frictional contact elements 13b, the frictional forces are increased during the brake application expansion movement due to self-reinforcement by the wedging action, while during the brake release return stroke a lower frictional contact force is experienced due to a more free floating action.

Figure 3A:
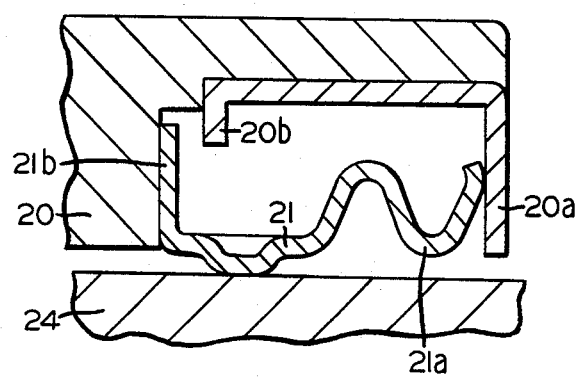
FIGS. 3A and 3B are partial sectional views of a variation of the compensating unit of FIG. 2; however, with a corrugated spring.
Figure 3B:
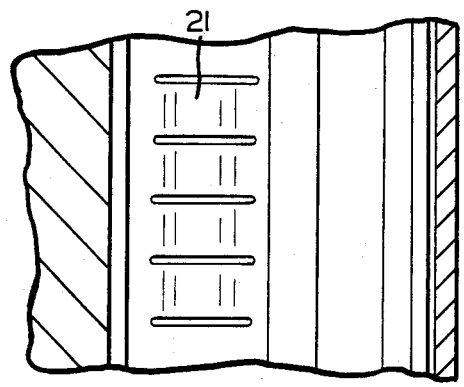

Referring now to FIGS. 3A and 3B, there is shown a modified version of the wear compensating unit which takes the form of a corrugated spring member 21. The use of the spring 21 having a corrugated end 21a in the direction of action of the resulting spring tension, might be advantageous when a greater clearance stroke is required.

A depending projection 20a is carried by the expansion element 20 which corresponds to the ring stop member 14 of FIG. 2 and which cooperates with respective forward corrugated portion 21a of spring 21. Further, a separate offset portion 20b is carried by the expansion element 20 which functions as a stop in conjunction with an upstanding projection 21b of the compensating unit 21. The other movable expansion element 24 is frictionally contacted by the underside of the compensating spring 21.

Figure 4A:
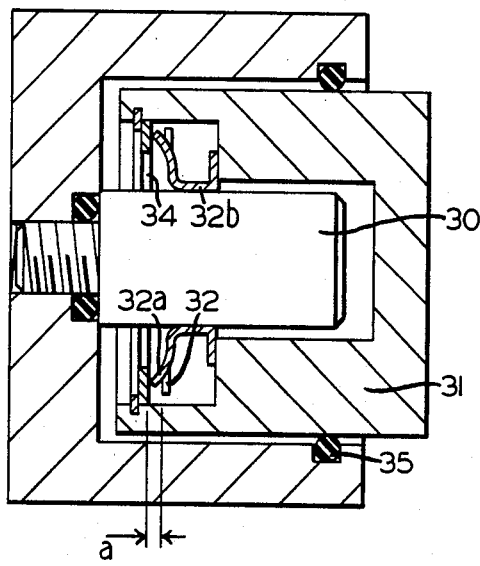
FIGS. 4A and 4B are partial views of a compensating unit which may be used in conjunction with a disk brake having a partial brake shoe lining.
Figure 4B:
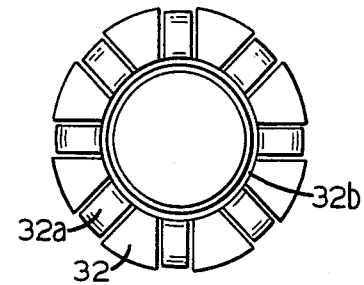

Referring now to FIGS. 4A and 4B, there is illustrated a modified arrangement of a compensating unit for use in a disk brake having partial shoe linings. As shown, the operating mechansim includes an inner cylindrical expansion element 30 and an outer cup-like expansion element 31. Thus, the expansion element 31 concentrically encompasses the expansion element 30. The compensating unit 32 is designed as a cup or ring-shaped grommet-like member which surrounds the expansion element 30. A plurality of projections 32b are located on the inner diametric surface to form the frictional contact elements which provide the frictional connection with the expansion element 30. A plurality of alternately resilient spring elements 32a are formed on a radially disposed segment flange of the compensating unit 32. An annular washer 34 serves as the retainer for the springs 32a as well as the stop of the compensating unit. A sealing ring 35 is provided for forming an air tight fluid chamber (not characterized) for actuating the expansion elements 30 and 31.

Figure 5:
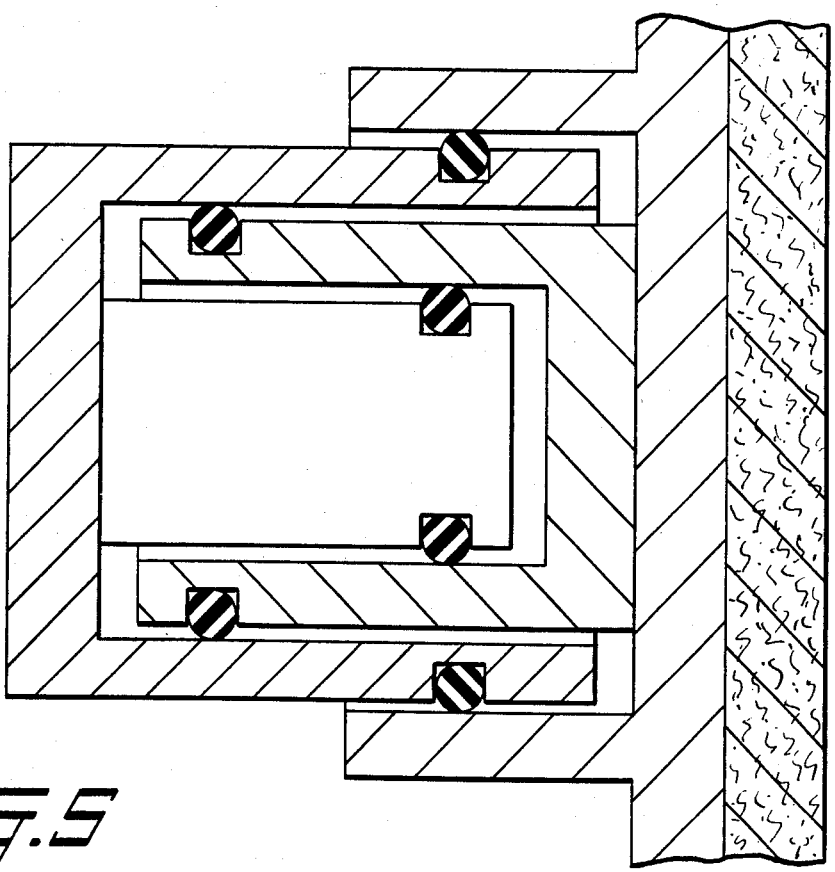
FIG. 5 is a partial schematic illustration of possible variations in which the unit of FIGS. 4A and 4B may be installed as indicated by the reference arrows.

The compensators illustrated in FIGS. 1, 2, and 3 may be used in any braking system where the fluid pressure expansion elements execute a relative motion for initiating the actuation of the brake shoes as shown in FIG. 5 (identification by arrows).

Returning now to FIGS. 1 and 2, it will be appreciated that the compensating unit functions in the following manner.

Now when the brake is operated, the expansion elements 9, 10 are moved apart by the fluid pressure applied to chamber 11. The compensating unit 13 is connected to the expansion element 10 via the frictional force of the frictional contact elements 13b, and it follows the motion of expansion element 10 against the tension of the spring members 13a which are held against the retaining flange 14. The clearance distance or free play "a" existing between the compensating unit 13 and the stop wall 14 corresponds to the maximum stroke or actual movement of the expansion elements 9, 10 for an effective braking application during normal operation of a vehicle.

However, in the event that the free play distance "a" is exceeded because of lining wear of the brake shoes during previous braking, the edge 13c of the compensating unit 13 will now come to rest against the stop wall 14 during a subsequent brake application. Thus, the expansion element 10 will slip in relation to the frictional contact elements 13b in the direction of distention. Thus, contact points move a respective distance which corresponds to the wear of the brake show linings. Now when the brakes are released, the elastic tension of the spring elements 13a moves the elements 9 and 10 toward their contracted position. Thus, the relaxing springs move back to the position shown in FIG. 2A and restore the play distance "a". Accordingly, the operating mechanism is fully contracted again corresponding to this play and the brake is completely released. It will be appreciated that the brake operating mechanism cannot be contracted completely by the amount which the expansion element 10 has slipped due to the action of the compensating unit 13 during the operation of the brakes. Since the wear of the brake linings has been equalized, the expansion elements 9, 10 will only move a distance equal to the free play "a" on the next brake application stroke.

Turning now to FIGS. 4A and 4B, it will be seen that when the expansion elements 30, 31 are moved apart, the compensating unit 32, which is joined to the expansion element 30 via the frictional force of the contact elements 32b, will follow the motion of expansion element 30 against the tension of spring fingers or elements 32a which rest against the retaining washer 34. The clearance distance or play "a" represents the maximum braking stroke of the expansion elements 30, 31 for effective braking is still equal to the distance "a" during normal operation of a vehicle.

In the event that during braking, the play "a" is exceeded because of wear of the brake linings, the parts 32 and 34 initially make contact, and then the expansion element 30 slips with respect to the friction contact elements 32b in the direction of expansion. The expansion element 30 moves relative to unit 32 a respective distance which corresponds to the wear of the brake shoe linings. When the brakes are released, the elastic force of the spring elements 32a begin to relax and will cause the elements 30, 31 to contract. Thus, when the operating mechanism is completely contracted, the clearance distance will again be "a" so that the brakes are toatally released. Thus, the brake operating mechanism can only move a distance equal to "a", so that the slippage of the expansion element 30 with respect to friction contact portions 32b automatically compensates for brake shoe wear during normal braking operation. Thus, the brake shoe will be equalized, and the stroke of expansion of the actuating elements 30, 31 is still no larger in spite of the wear.

In viewing FIGS. 6A and 6B, it will be seen that the spring return elements of the compensator may be designed to have greater lengths due to their angular orientation with respect to the end resting against the depending stop member. Accordingly, one end of the compensating unit is yieldable while the other end is very rigid. A compensator having these properties advantageously uses an operating mechanism having limited structural space by virtue of its unique design.

It will be understood that various alterations and changes may be made by those skilled in the art without departing from the spirit and scope of the present invention. Therefore, it will be appreciated that certain modifications, ramifications, and equivalents will be readily apparent to those who are skilled artisans and, accordingly, it is understood that the subject invention should not be limited to the exact embodiments shown and described, but should be accorded the full scope and protection of the appended claims.

Having thus described our invention, what we claim as new and desire to secure by Letters Patent, is:

1. A fluid pressure operated mechanism for disk brakes having brake shoes, comprising:
   (a) a pair of expansion elements movable with respect to one another wherein the brake shoes are forced against the surfaces of a pair of brake disks,
   (b) compensating means located between said two expansion elements for maintaining a given clearance between said surfaces of said brake disks and said brake shoes,
   (c) said compensating means takes the form of a one-piece, ring-shaped connecting link which is flexibly supported against one of said two expansion elements so as to oppose the relative movement of said expansion elements during application of the brake shoes,
   (d) said connecting link is frictionally connected to the other of said two expansion elements,
   (e) a stop is provided on one of said two expansion elements which engages said connecting link to allow said connecting link to move relative to the other of said two expansion elements during brake application to compensate for brake shoe wear and to maintain a given clearance,
   (f) said connecting link includes a plurality of first projections which function as return spring elements during brake release,
   (g) said connecting link includes a plurality of second projections for frictionally engaging said other of the two expansion elements, and
   (h) said first projections of said connecting link are designed as offset portions which are corrugated in the direction of the resulting spring force.

2. The fluid pressure operated mechanism as defined in claim 1, wherein:
   (a) said first and second projections of said connecting link are formed of a single piece of material.

3. The fluid pressure operated mechanism as defined in claim 1, wherein:
   (a) said second projections of said connecting link take the form of frictional contact elements which have points on their free ends so that said connecting link is movable in relation to said other expansion element when the brake is released.

4. The fluid pressure operated mechanism as defined in claim 1, wherein:
   (a) said first projections of the connecting link are designed as offset portions which have their free ends engaging an annular ring carried by said one expansion element.

5. The fluid pressure operated mechanism as defined in claim 1, wherein:
   (a) said first flexible projections of said connecting link are equidistantly spaced from one another.

6. The fluid pressure operated mechanism as defined in claim 1, wherein:
   (a) said second projections of said connecting link are equidistantly spaced from one another.

7. The fluid pressure operated mechanism as defined in claim 1, wherein:
   (a) said second projections of said connecting link are designed as recesses in connecting link.

8. The fluid pressure operated mechanism as defined in claim 1, wherein:
   (a) said first projections form an angle of approximately 90° with a flat portion of said connecting link.

9. The fluid pressure operated mechanism as defined in claim 1, wherein:
   (a) said other expansion element is a cylinder,
   (b) said connecting link is an annular cup-shaped member which surrounds said cylindrical expansion element,
   (c) said second projections of said connecting link are arranged on the inside diameter of said connecting link, and
   (d) said one expansion element surrounds said other expansion element.

10. The fluid pressure operated mechanism as defined in claim 1, wherein:
    (a) said first projections function as the return spring for said expansion elements when the brake is released.

11. The fluid pressure operated mechanism as defined in claim 1, wherein:
    (a) said expansion elements are annular members, each having a U-shaped cross section,
    (b) said expansion elements are arranged concentrically relative to each other so that one leg of the U-shaped cross section of said one expansion element lies between the two legs of the U-shaped cross section of said other expansion element, and
    (c) said connecting link is located in relationship to the center axis of said two annular expansion elements between the two central U-legs of said two expansion elements.

12. The fluid operated mechanism as defined in claim 11, wherein:
    (a) a sealing ring is located between the inner and outer U-legs of each of said two annular expansion elements.

* * * * *